United States Patent
Alduino et al.

(10) Patent No.: US 6,721,087 B2
(45) Date of Patent: Apr. 13, 2004

(54) OPTICAL AMPLIFIER WITH DISTRIBUTED EVANESCENTLY-COUPLED PUMP

(75) Inventors: Andrew C. Alduino, Santa Clara, CA (US); Dmitri E. Nikonov, San Jose, CA (US); David S. Funk, San Jose, CA (US); Christopher J. Scholz, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 10/017,614

(22) Filed: Dec. 13, 2001

(65) Prior Publication Data

US 2003/0112497 A1 Jun. 19, 2003

(51) Int. Cl.[7] .................................................. H01S 3/00
(52) U.S. Cl. ..................................... 359/333; 359/341.3
(58) Field of Search .............................. 359/333, 341.3, 359/342, 345

(56) References Cited

U.S. PATENT DOCUMENTS

| | | | |
|---|---|---|---|
| 4,515,431 A | * | 5/1985 | Shaw et al. .............. 350/96.15 |
| 4,785,459 A | | 11/1988 | Baer |
| 5,181,223 A | | 1/1993 | Baer |
| 5,227,913 A | | 7/1993 | McCaughan et al. |
| 5,271,031 A | | 12/1993 | Baer |
| 5,365,538 A | | 11/1994 | Tumminelli et al. |
| 5,535,051 A | | 7/1996 | Basiev et al. |
| 5,761,234 A | | 6/1998 | Craig et al. |
| 5,774,488 A | | 6/1998 | Kmetec |
| 5,920,423 A | | 7/1999 | Grubb et al. |
| 5,982,802 A | | 11/1999 | Thony et al. |
| 6,069,907 A | | 5/2000 | Chang |
| 6,212,310 B1 | | 4/2001 | Waarts et al. |
| 6,243,515 B1 | | 6/2001 | Heflinger et al. |
| 6,289,027 B1 | * | 9/2001 | Lawrence et al. .............. 372/6 |
| 6,356,574 B1 | | 3/2002 | Craig et al. |
| 6,418,156 B1 | | 7/2002 | Peressini |
| 6,493,476 B2 | * | 12/2002 | Bendett ........................ 385/14 |

FOREIGN PATENT DOCUMENTS

| | | |
|---|---|---|
| EP | 0128333 A2 | 8/2000 |
| JP | 2001-308422 A | 11/2001 |
| WO | WO 01/28049 A2 | 4/2001 |

\* cited by examiner

Primary Examiner—Mark Hellner
(74) Attorney, Agent, or Firm—Blakely, Sokoloff, Taylor & Zafman LLP

(57) ABSTRACT

An optical amplifier comprises a device substrate, a first waveguide embedded in the device substrate, a plurality of pumping waveguides coupled along interspersed portions of the first waveguide, and a plurality of lasers. The lasers are positioned to provide pumping light beams into the pumping waveguides.

17 Claims, 5 Drawing Sheets

OPTICAL AMPLIFIER WITH DISTRIBUTED EVANESCENTLY-COUPLED PUMP

FIELD

The described invention relates to the field of optical signal amplification. In particular, the invention relates to amplifying an optical signal using multiple pumping light sources.

BACKGROUND

A waveguide may serve as an optical amplifier by doping it with ions of a rare earth element such as Erbium. An optical signal propagating in the waveguide is amplified when a pumping light beam is introduced. For example, Erbium ions, excited to a higher energy state with a pumping light beam having a wavelength of approximately 980 nm or 1480 nm, will amplify an optical signal in a wide wavelength band around 1530–1600 nm as the Erbium ions fall down to a lower energy state. This technique is well-known in optical fiber amplification.

FIG. 1 is a schematic diagram showing one prior art method of amplifying an optical signal 10 in a planar waveguide 20. The waveguide 20 is embedded in a substrate 30 and doped with Erbium ions. An optical signal 10 is directed into the waveguide 20 and propagates through the waveguide 20. A laser 50 supplies pumping light beams into the waveguide 20 in a co-propagating direction, i.e., in substantially the same direction as the optical signal propagates. The signal 10 and the pump 50 are combined to the same waveguide 20, for example, in an evanescent directional coupler. In one example, an optical signal 10 having wavelength of approximately 1550 nm is amplified as laser 50 supplies pumping light beams of approximately 980 nm or 1480 nm wavelength.

FIG. 2 is a schematic diagram showing another prior art method of amplifying an optical signal. In FIG. 2, a pump laser 50 is directed from the opposite end of the waveguide 20 to pump light in a counter-propagating direction, i.e., in a direction opposite to that of the optical signal. Similar to FIG. 1, the optical signal is amplified within the waveguide 20 and then exits the substrate 30.

Modern optical networks use single-mode optical fibers for transmission over long distances. This avoids signal degradation coming from chromatic dispersion, i.e. dependence of the speed of the light on its wavelength. For efficient interfacing with single mode fibers, all optical components, including fiber or waveguide amplifiers, are effectively single-mode. Due to a general principle of optics, "brightness conservation theorem", power of light in a single mode cannot be increased using just linear passive (not adding energy) optical elements. This results in a fact that the power of light with a certain wavelength from only one mode can be coupled to a single mode waveguide. For amplifiers, it translates that only one pump laser with a certain wavelength can supply pump light in each direction of propagation and each polarization.

The optical signal experiences gain in an optical amplifier provided that the intensity of the pump is higher than a certain threshold value dependent on the intensity of the optical signal and material properties of the optical amplifier. In order to achieve high enough gain, the intensity of the pump must be much higher than the threshold value. Consequently, a high power of a pump laser is typically required.

There are several disadvantages of the above methods compared to the invention described below. First, the relatively high power laser used in the described co-propagating and counter-propagating amplification is expensive. Second, high power lasers have a high power dissipation, which may cause thermal issues in their packaging. Third, the reliability of high power lasers is generally not as good as that of lower power lasers.

DETAILED DESCRIPTION

An apparatus and method for amplifying an optical signal in a primary waveguide is disclosed. Multiple lower-power light sources provide pumping light beams along interspersed portions of the primary waveguide. In one embodiment, laser diodes provide pumping light beams into pumping waveguides that are evanescently coupled to the primary waveguide. The pumping light beams successively amplify the optical signal in the primary waveguide.

Figure 1:
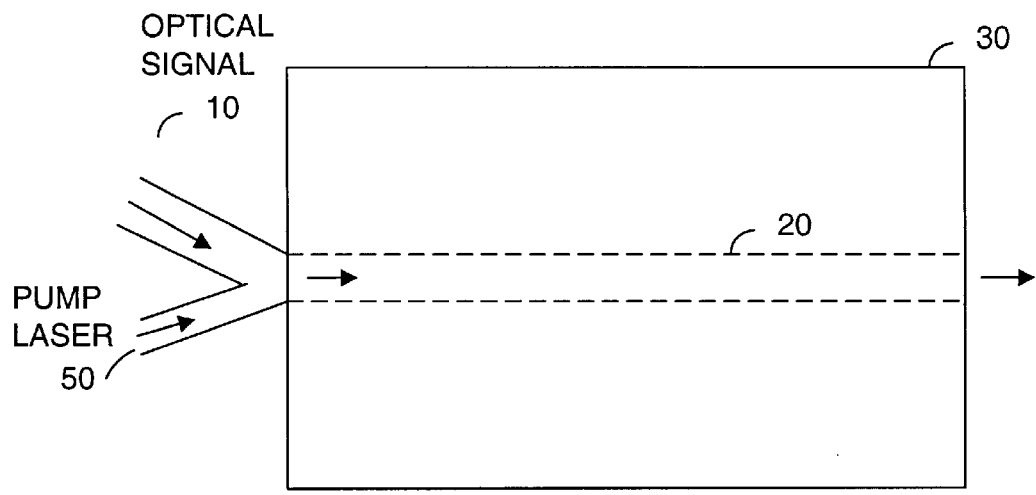
FIG. 1 is a schematic diagram showing one prior art method of amplifying an optical signal in a planar waveguide.
Figure 2:
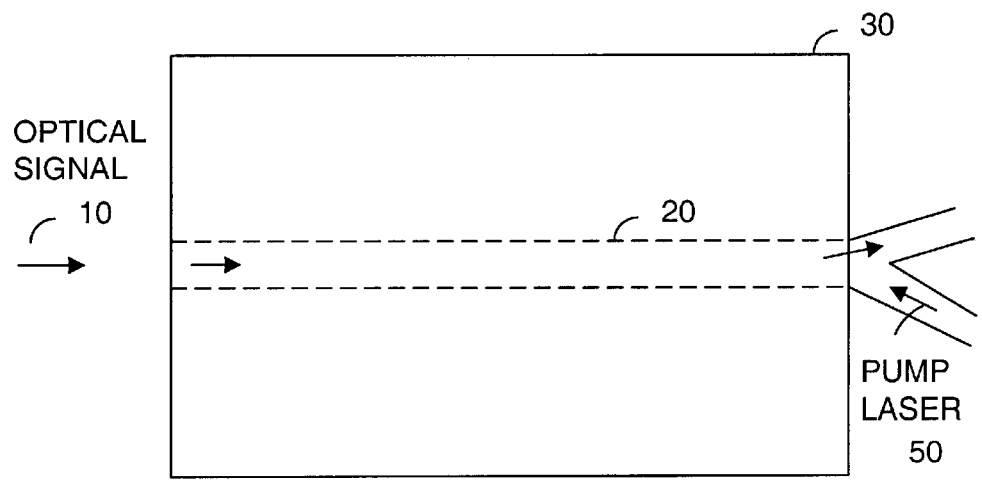
FIG. 2 is a schematic diagram showing another prior art method of amplifying an optical signal.
Figure 3:
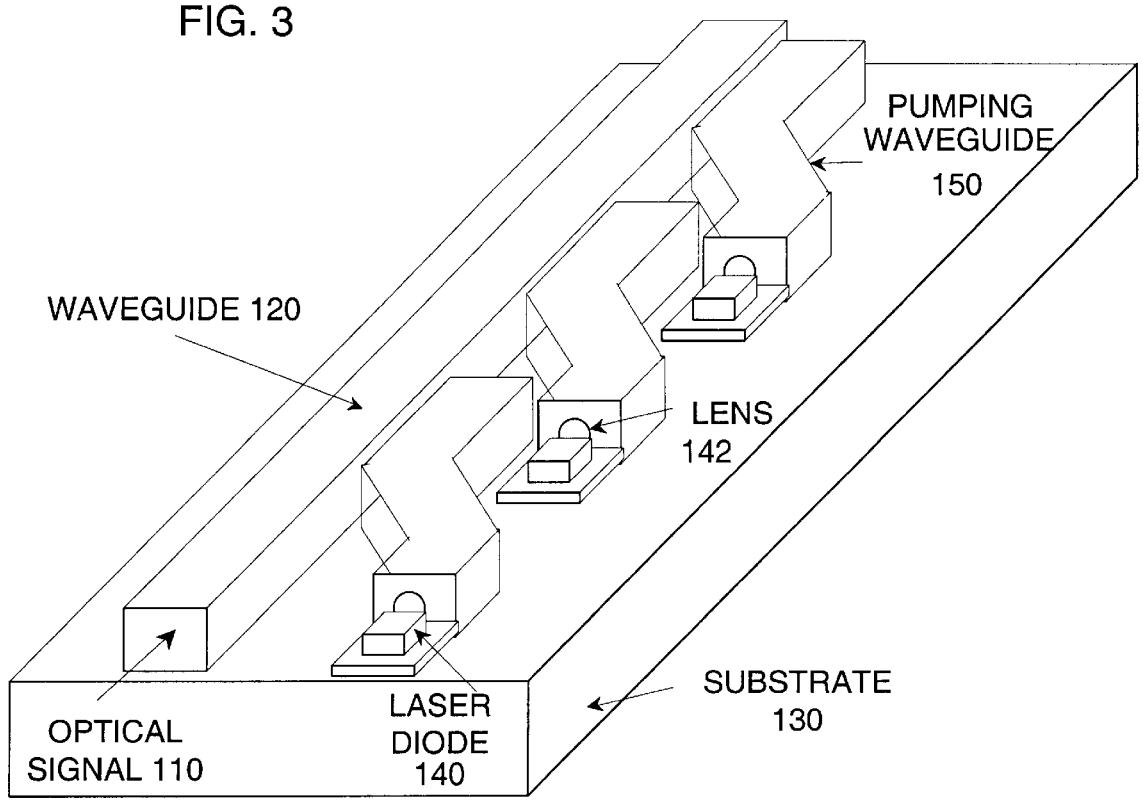
FIG. 3 is a perspective diagram showing a 3-dimensional view of one embodiment of an optical amplifier.

FIG. 3 is an example diagram showing a 3-dimensional view of one embodiment of an optical amplifier. An optical signal 110 enters into and propagates through waveguide 120, which, in one embodiment, is a single-mode waveguide. Multiple light sources 140, such as laser diodes, are coupled to provide pumping light beams into pumping waveguides 150. The pumping waveguides 150 are positioned adjacent to interspersed portions of waveguide 120. In one embodiment, the pumping waveguides 150 are evenly spaced along the waveguide 120, although other embodiments may include different spacings between the pumping waveguides 150. An upper cladding (not shown) surrounds the waveguides 120 and 150. In one embodiment, laser diodes 120 may be coupled to the pumping waveguides 150 via trenches in the substrate 130. In one embodiment, the laser diodes 120 may be directed into lenses 142 to direct the pumping light beams into the pumping waveguides 150.

The waveguides 120 and 150 may be formed in substrate 130 in a variety of different ways, such as by diffusion of various ionic species, etching, and/or epitaxial growth, as are well-known. "Embedded within a substrate" is meant to include these various ways, including silicon-on-insulator. In some cases, the waveguide may actually be deposited on top of a substrate and covered with a cladding material different from the substrate, but is also meant to be covered by the term "embedded within a substrate".

For example, in one embodiment, a glass substrate may be used, and ion diffusion may be employed to create waveguides embedded in the glass. In another embodiment, a silicon substrate may be used. Silicon oxide may be deposited for cladding, and etching may be used to remove the non-waveguide material. An upper cladding of, e.g., silicon oxide, may then be deposited on top of the waveguides 120 and 150.

Figure 4:
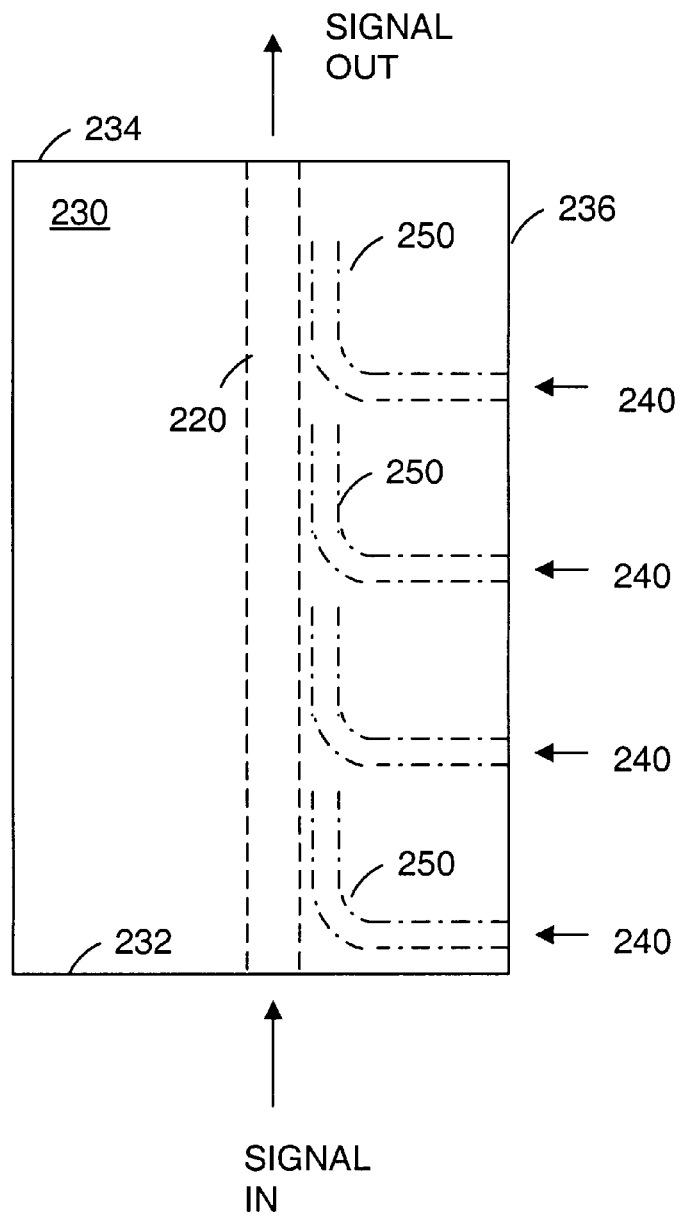
FIG. 4 is another example diagram showing an embodiment of an optical amplifier.

FIG. 4 is another example diagram showing an embodiment of an optical amplifier. In this embodiment, primary waveguide 220 may be formed to run from one side 232 of the substrate to an opposite side 234. Light sources 240, such as laser diodes, provide pumping light beams to pumping waveguides 250 from a third side 236 of the substrate 230. The pumping waveguides 250 bend inside the substrate 230 to provide evanescent coupling to the primary waveguide 220.

In one embodiment, light sources 240 provide pumping light beams to the pumping waveguides 250 via optical fibers (not shown). In another embodiment, the light sources 240 are coupled directly to the substrate 230.

In one embodiment, the light sources 240 comprise vertical cavity surface emitting lasers (VCSELs). In one embodiment, the VCSELS may be bonded directly to a surface of the device substrate 230.

In one embodiment, the VCSELs use relatively low power. For example, a VCSEL may emit, but is not limited to, less than 20 mW of power. Comparable high power lasers used in co-propagating and counter-propagating architectures use higher power lasers, such as, but not limited to, 100 mW.

Figure 5:
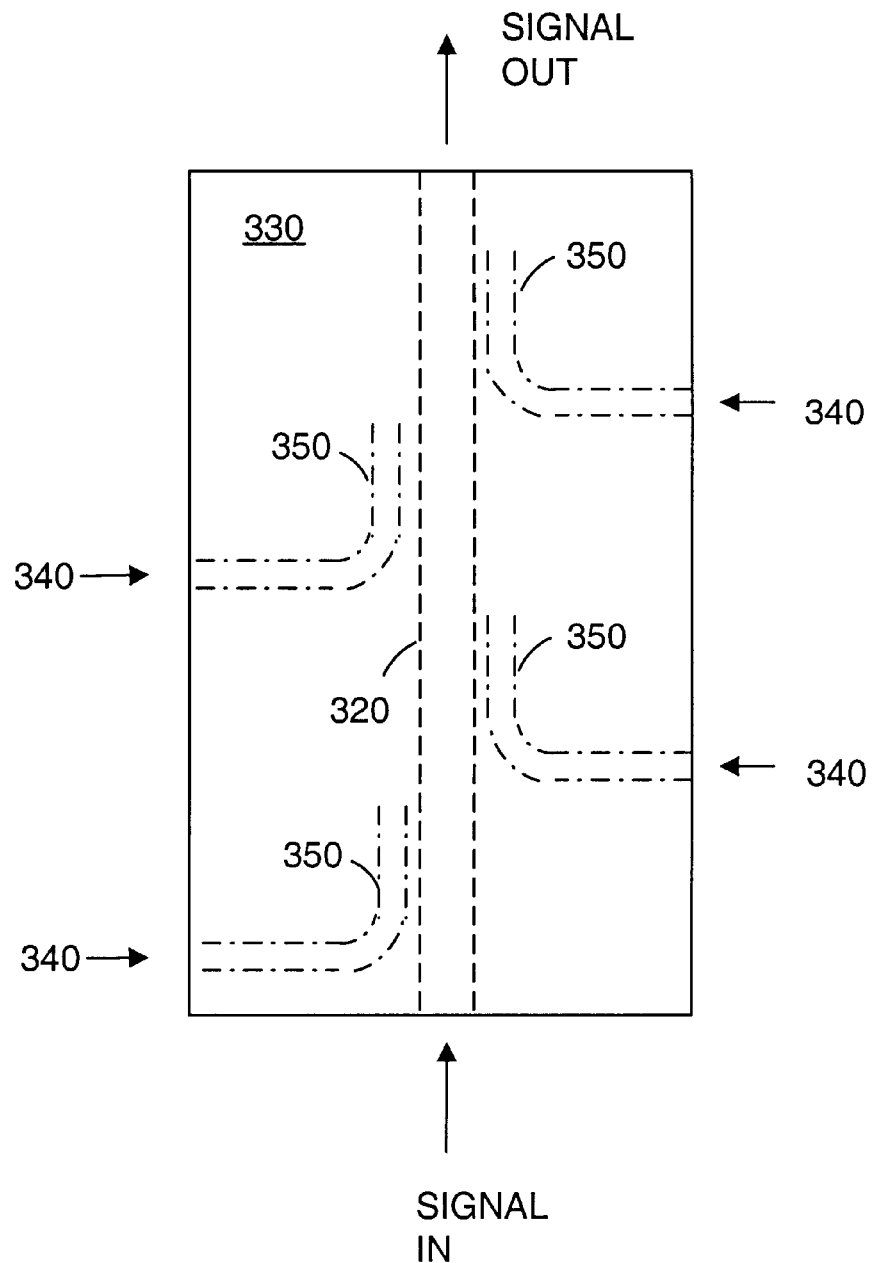
FIG. 5 is an example diagram showing a top view of an embodiment of an optical amplifier having pumping waveguides on both sides of the primary waveguide.

FIG. 5 is an example diagram showing a top view of an embodiment of an optical amplifier having pumping waveguides 350 on both sides of the primary waveguide 320. Light sources 340 may be provided from both sides of the substrate 330.

Figure 6:
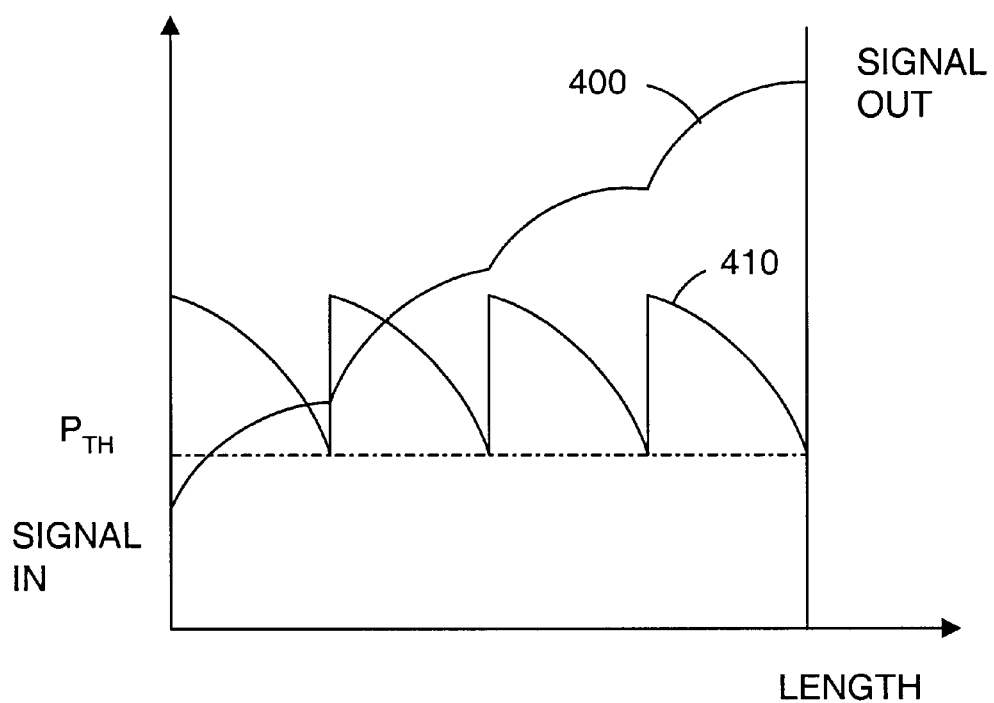
FIG. 6 is an example graph illustrating an increase in optical signal power due to the optical pumping.

FIG. 6 is an example graph illustrating an increase in optical signal power 400 due to the optical pumping 410. In one embodiment, the pumping light beams provide a power over a particular threshold Pth in order to provide gain. FIG. 6 illustrates that by successively pumping the optical signal, the power of the optical signal is raised even though lower-power laser diodes may provide a pumping light signal not significantly above the gain threshold Pth. Lower power laser diodes have the advantage of generally being cheaper and more reliable than higher power laser diodes, as previously mentioned.

Thus, an apparatus and method for amplifying an optical signal is disclosed. However, the specific arrangements and methods described herein are merely illustrative. For example, there are various ways to fabricate a waveguide embedded in a substrate, such as by diffusion of various ionic species, etching, and epitaxial growth. One skilled in the art could use any of various methods to fabricate such an embedded waveguide. Additionally, an upper cladding over the waveguides may be employed that has not been shown. Numerous modifications in form and detail may be made without departing from the scope of the invention as claimed below. The invention is limited only by the scope of the appended claims.

What is claimed is:

1. An optical amplifier comprising:
   a device substrate;
   a first waveguide embedded in the device substrate;
   a plurality of pumping waveguides successively coupled along interspersed portions of the first waveguide; and
   a plurality of lasers positioned to provide a plurality of pumping light beams into the plurality of pumping waveguides.

2. An optical amplifier comprising:
   a device substrate;
   a first waveguide embedded in the device substrate;
   a plurality of pumping waveguides coupled along interspersed portions of the first waveguide; and
   a plurality of lasers positioned to provide a plurality of pumping light beams into the plurality of pumping waveguides,
   wherein the plurality of pumping waveguides are coupled to the first waveguide at evenly spaced intervals.

3. An optical amplifier comprising:
   a device substrate;
   a first waveguide embedded in the device substrate;
   a plurality of pumping waveguides coupled along interspersed portions of the first waveguide; and a plurality of lasers positioned to provide a plurality of pumping light beams into the plurality of pumping waveguides,
   wherein the plurality of lasers are vertical cavity surface emitting lasers.

4. The optical amplifier of claim 3 wherein the vertical cavity surface emitting lasers are bonded to the device substrate.

5. The optical amplifier of claim 1 wherein the first waveguide is at least partially doped with Erbium ions around the first waveguide.

6. The optical amplifier of claim 1, wherein the plurality of lasers each emit less than approximately 20 mW of power.

7. A method of amplifying an optical signal comprising:
   directing the optical signal through a waveguide, the optical signal having a first direction of propagation; and
   applying pumping light beams at successively interspersed portions of the waveguide.

8. The method of claim 7, wherein the pumping light beams are evanescently coupled via a plurality of pumping waveguides.

9. The method of claim 8, wherein pumping light beams are provided by a plurality of laser diodes.

10. The method of claim 8, wherein the optical signal has a wavelength of approximately 1550 nm, and the pumping light beams have a wavelength of approximately 980 nm.

11. The method of claim 10, wherein the applying the pumping light beams further comprises:
    using a plurality of lasers each emitting less than 20 mW of power.

12. An optical amplifier comprising:
    a substrate;
    a first waveguide embedded within the substrate;
    a plurality of pumping waveguides successively coupled to the first waveguide to successively pump a light signal in the first waveguide.

13. The optical amplifier of claim 12, wherein the plurality of pumping waveguides successively pump the light signal along interspersed portions of the first waveguide.

14. An optical amplifier comprising:
    a substrate;
    a first waveguide embedded within the substrate; a plurality of pumping waveguides coupled to the first waveguide to successively pump a light signal in the first waveguide,
    wherein the interspersed portions are evenly spaced along the first waveguide.

15. The optical amplifier of claim 13 further comprising:
    a plurality of laser diodes coupled to provide a pumping light signal into the plurality of pumping waveguides.

16. The optical amplifier of claim 15, wherein the plurality of laser diodes each emit less than 20 mW of power.

17. The optical amplifier of claim 15 further comprising:
    a plurality of lenses coupled between the plurality of laser diodes and the plurality of pumping waveguides.

* * * * *